United States Patent
Brunson

(10) Patent No.: US 12,002,238 B1
(45) Date of Patent: Jun. 4, 2024

(54) CONTACTLESS MOBILE FINGERPRINTING CAPTURE DEVICE AND METHOD OF USE

(71) Applicant: Bureau of Innovation LLC, Chicago, IL (US)

(72) Inventor: Brock Brunson, Chicago, IL (US)

(73) Assignee: Bureau of Innovation LLC, Chicago, IL (US)

( * ) Notice: Subject to any disclaimer, the term of this patent is extended or adjusted under 35 U.S.C. 154(b) by 0 days.

(21) Appl. No.: 18/230,783

(22) Filed: Aug. 7, 2023

Related U.S. Application Data

(60) Provisional application No. 63/349,661, filed on Jun. 7, 2022.

(51) Int. Cl.
| | | |
|---|---|---|
| *G06T 7/73* | (2017.01) | |
| *G06T 7/00* | (2017.01) | |
| *G06T 7/60* | (2017.01) | |
| *G06T 7/80* | (2017.01) | |
| *G06V 40/12* | (2022.01) | |
| *G06V 40/13* | (2022.01) | |
| *G06V 40/50* | (2022.01) | |

(52) U.S. Cl.
CPC .................. *G06T 7/73* (2017.01); *G06T 7/60* (2013.01); *G06T 7/80* (2017.01); *G06T 7/97* (2017.01); *G06V 40/1318* (2022.01); *G06V 40/1365* (2022.01); *G06V 40/50* (2022.01); *G06T 2207/20081* (2013.01); *G06T 2207/20084* (2013.01); *G06T 2207/20092* (2013.01); *G06T 2207/30196* (2013.01)

(58) Field of Classification Search
CPC .... G06T 7/73; G06T 7/60; G06T 7/80; G06T 7/97; G06T 2207/20081; G06T 2207/20084; G06T 2207/20092; G06T 2207/30196; G06V 40/1318; G06V 40/1365; G06V 40/50
See application file for complete search history.

(56) References Cited

U.S. PATENT DOCUMENTS

| | | | | |
|---|---|---|---|---|
| 2022/0021814 A1* | 1/2022 | Walch | ................. | H04N 23/743 |
| 2023/0127218 A1* | 4/2023 | Hsieh | ................. | G06V 10/764 |
| | | | | 382/100 |
| 2023/0204832 A1* | 6/2023 | Suzuki | ................. | G02B 30/33 |
| | | | | 348/51 |
| 2023/0298194 A1* | 9/2023 | Doi | ................. | G01B 11/03 |
| | | | | 382/100 |

* cited by examiner

*Primary Examiner* — Bobbak Safaipour
(74) *Attorney, Agent, or Firm* — Michael D. Eisenberg

(57) ABSTRACT

A method for determining object's size, including: providing a calibration card having a picture printed thereon; providing a first real size of the picture; setting a camera of a computing device to a fixed focus; capturing a first image of the calibration card when the picture is in focus; measuring a first virtual size of the at least one dimension in the first image in pixels; calculating a pixel density of the first image, by dividing the first virtual size by the first real size; capturing a second image of an object, when the object is in focus; measuring a second virtual size of at least one distance between two virtual points located on the second image; calculating a second real size of at least one distance between two real points of the object corresponding to the two virtual points, by dividing the second virtual size by the pixel density.

20 Claims, 7 Drawing Sheets

302   300

304

400

402

CONTACTLESS MOBILE FINGERPRINTING CAPTURE DEVICE AND METHOD OF USE

CROSS-REFERENCE TO RELATED APPLICATIONS

This application claims priority from U.S. Provisional Application Ser. No. 63/349,661 filed on Jun. 7, 2022, which is hereby incorporated herein by reference in its entirety.

TECHNICAL FIELD

This invention relates to the field of fingerprint capture, forensic examination, and mobile applications.

BACKGROUND OF THE INVENTION

Many devices and methods for fingerprint capture are available on the market. Most require a person to make physical contact with a hardware device in order for the person's fingerprint image to be captured. Some techniques are available for contactless fingerprint capture. However, many of these techniques have difficulty accurately measuring distance or scale of fingerprint images, which is important for database comparison. Many such devices and methods also use image processing algorithms that have difficulty transforming and processing optical images of fingerprints into images that accurately represent minutiae and other features that are important for database comparison and forensic examination, particularly in the presence of image distortion and varied lighting conditions.

Fingerprint capture devices which require physical contact with the person whose fingerprints are to be captured present challenges for entities or organizations making use of such devices, including, but not limited to, hardware acquisition costs, hygienic concerns, and lack of cooperation by persons whose fingerprints are to be captured.

When capturing fingerprint images from latent, patent, or plastic fingerprint impressions, such as those found in a crime scene, there is a necessity to avoid disturbing, contaminating, or otherwise modifying physical evidence including fingerprint impressions.

BRIEF SUMMARY OF EMBODIMENTS OF THE INVENTION

The present invention aims to provide technique for contactless fingerprint capture, which does not require the use of custom devices, but can be performed by a user having an everyday mobile device (smartphone, tablet, etc.)

The use of the provided contactless fingerprint capture device and method enables operators to capture fingerprint images at crime scenes without making physical contact with evidence, and to capture fingerprint images of persons without making physical contact with those persons.

Once the fingerprint image is captured contactlessly and easily, the resulting fingerprint images are accurate enough to be used for database comparison, forensic examination, or other purposes for which it is desired to identify a person or persons based on a fingerprint or fingerprints.

Therefore, an aspect of some embodiments of the present invention relates to a method for determining a size of an object. The method includes: providing of a calibration card having a predetermined picture printed thereon; providing a first real size of at least one dimension of the picture to the computing device; setting a camera of a computing device to a fixed focus; capturing, with the camera, a first image of the calibration card, the first image being captured when the picture is in focus; measuring, via the computing device, a first virtual size of the at least one dimension in the first image in pixels; calculating via the computing device a pixel density of the first image, by dividing the first virtual size by the first real size; capturing, with the camera, a second image of an object, when the object is in focus; measuring, via the computing device, a second virtual size of at least one distance between two virtual points located on the second image; calculating, via the computing device, a second real size of at least one distance between two real points of the object corresponding to the two virtual points, by dividing the second virtual size by the pixel density; storing the second real size.

In a variant, setting the camera to the fixed focus comprises selecting the fixed focus from a plurality of fixed foci.

In another variant, the computing device comprises a processor and memory. Providing the first real size to the computing device comprises installing machine-readable instructions in the memory, the machine-readable instruction comprising card data indicative of the first real size.

In a variant, the camera comprises a display configured for displaying the first image in real time. Capturing the first image comprises: wherein capturing the first image comprises: receiving, by computing device, and instruction to capture the first image when an image of the picture on the display is in focus, after a user has moved the camera and/or the calibration card with respect to each other, until an image of the picture is displayed in focus on the display; activating the camera to capture the received image in response to the user instruction.

In a variant, providing the picture comprises providing a focusing artefact configured to be seen clearly on the display only when the card is in focus.

The focusing artefact may comprise at least one of a Siemens star, a spoke target.

In a variant, measuring the first virtual size comprises: locating, via the computing device, at least two corners on the picture; and measuring a distance between the two corners.

In a variant, the computing device comprises the camera.

In a variant, the object is a finger pad and the second image is an image of a finger pad, the method further comprising: processing the second image and using the second real size to generate a fingerprint impression of the finger pad.

In a variant, the method comprises comparing the fingerprint to a plurality of known fingerprints.

In a variant, processing the second image comprises: providing a machine learning system stored on the computing device or on a remote server and configured to generate the fingerprint impression of the finger form the second image and using the second real size; and processing, by the machine learning system, the second image and the second real size to generate the fingerprint impression.

In a variant, providing the machine learning system comprises: providing a plurality of training fingerprint impressions in black and white; synthetically generating, by a second computing device, a plurality of training images of finger pads, each training image resembling a photographed image of a finger pad and being generated by a respective one of the training fingerprint impressions; using the plurality of fingerprint impressions and the plurality of corresponding training images to train the machine learning system to generate a fingerprint impression from a photographed finger pad image.

In a variant, synthetically generating, the plurality of training images of finger pads comprises: inverting the training fingerprint impressions, such that black regions are converted to white while white regions are converted to black, so that ridges of each fingerprint impression are shown in white while a background of each impression is shown in black; removing black color from each background, leaving only the white ridges; embossing and beveling the ridges, thereby creating a three-dimensional appearance in which the ridges have a simulated shadow; filling each background with a gray layer; applying noise; applying lighting effects to make certain regions of each training image appear darker and other regions of each training image appear lighter.

In a variant, the machine learning system comprises a generative adversarial network.

Another aspect of some embodiments of the present invention relates to a system for determining a size of an object, the system comprising a calibration card and a computing device. The calibration card has a predetermined picture printed thereon. The computing device has a camera, a processor, and a memory, and the memory storing at least one dimension of the picture and machine-readable instructions that, when executed by the processor, cause the processor to: set a camera of a computing device to a fixed focus; operate the camera to capture a first image of the calibration card according to a user instruction to the computing device, the first image being captured via the camera when the picture is in focus; receive the first image from the camera; measure a first virtual size in the first image in pixels, the first virtual size corresponding to the at least one dimension; calculate a pixel density of the first image, by dividing the first virtual size by the first real size; operate the camera to capture a second image of an object according to a user instruction to the computing device, the second image being captured via the camera when the object is in focus; receive the second image from the camera; measure a second virtual size of at least one distance between two virtual points located on the second image; calculate a second real size of at least one distance between two real points of the object corresponding to the two virtual points, by dividing the second virtual size by the pixel density.

In a variant, the computing device comprises a display configured for displaying the first image in real time. The picture comprises a focusing artefact configured to be seen clearly on the display only when the card in focus.

In a variant, the processor is configured to measuring the first virtual size by: locating, via the computing device, at least two corners on the picture; and measuring a distance between the two corners.

In a variant, the object is a finger pad and the second image is an image of a finger pad, the system comprising, in the machine-readable instructions, image processing instructions configured to cause the processor to process the second image and use the second real size to generate a fingerprint impression image of the finger pad.

In a variant, the system further comprises a server configured to communicate with the computing device via a network, the server comprising a second processor and a second memory, the second memory storing second machine-readable instructions which, when executed, cause the processor to process the second image and use the second real size to generate a fingerprint impression image of the finger pad.

A further aspect of some embodiments of the present invention relates to machine-readable instructions configured to be executed by a processor and cause the processor of a computing device to: set a camera of a computing device to a fixed focus according to a first user instruction; receive from the camera a first image of a calibration card having a predetermined picture printed thereon, the first image being photographed by a second user instruction to the computing device, the first image being captured via the camera when the picture is in focus; measure a first virtual size in the first image in pixels, the first virtual size corresponding to the at least one dimension; calculate a pixel density of the first image, by dividing the first virtual size by the first real size; receive from the camera a second image of an object, the second image being photographed by a third user instruction to the computing device, when the object is in focus; measure a second virtual size of at least one distance between two virtual points located on the second image; calculate a second real size of at least one distance between two real points of the object corresponding to the two virtual points, by dividing the second virtual size by the pixel density.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
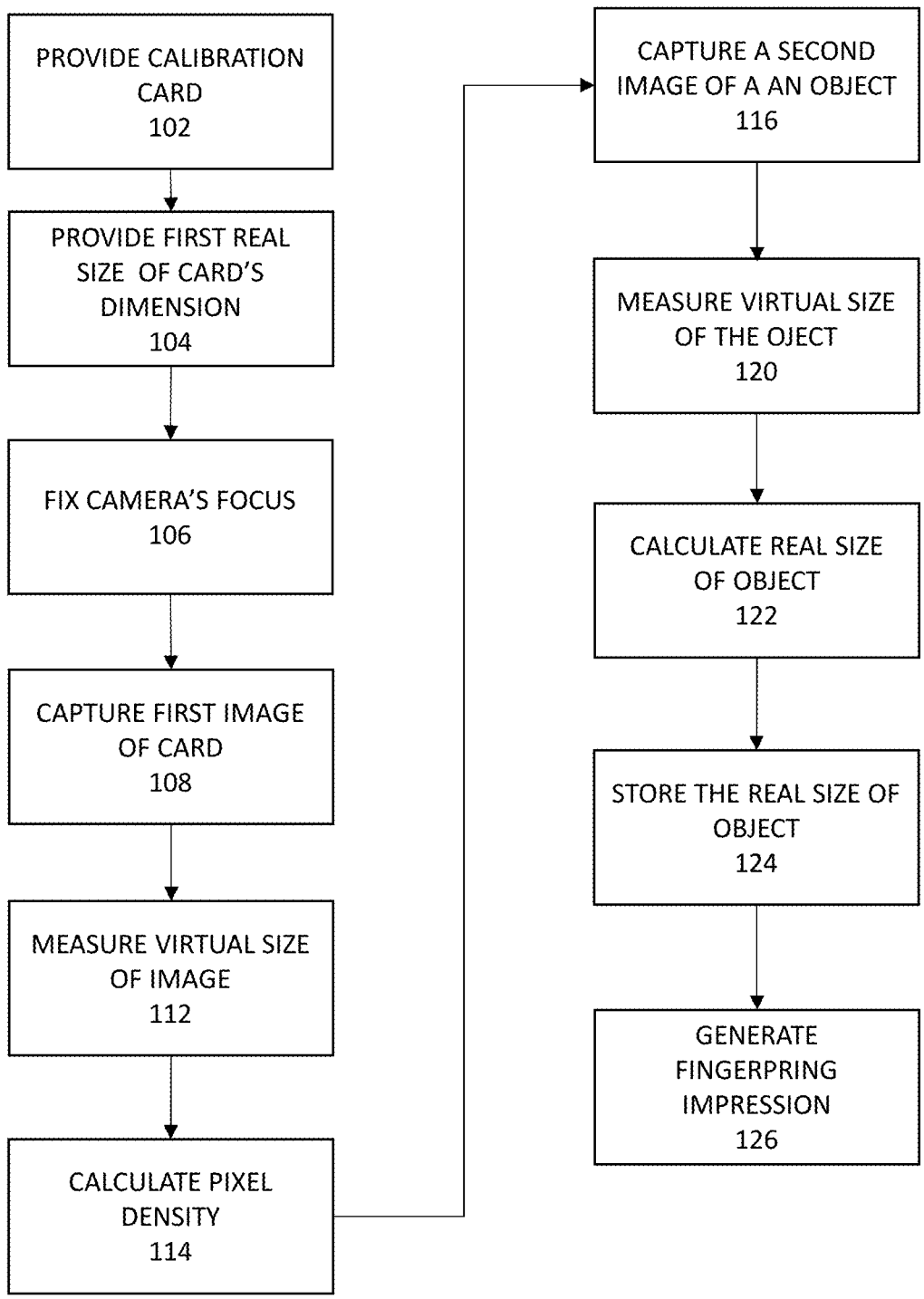
FIG. 1 is a flowchart illustrating a method for calculating a size of a photographed object, according to some embodiments of the present invention.
Figure 2:
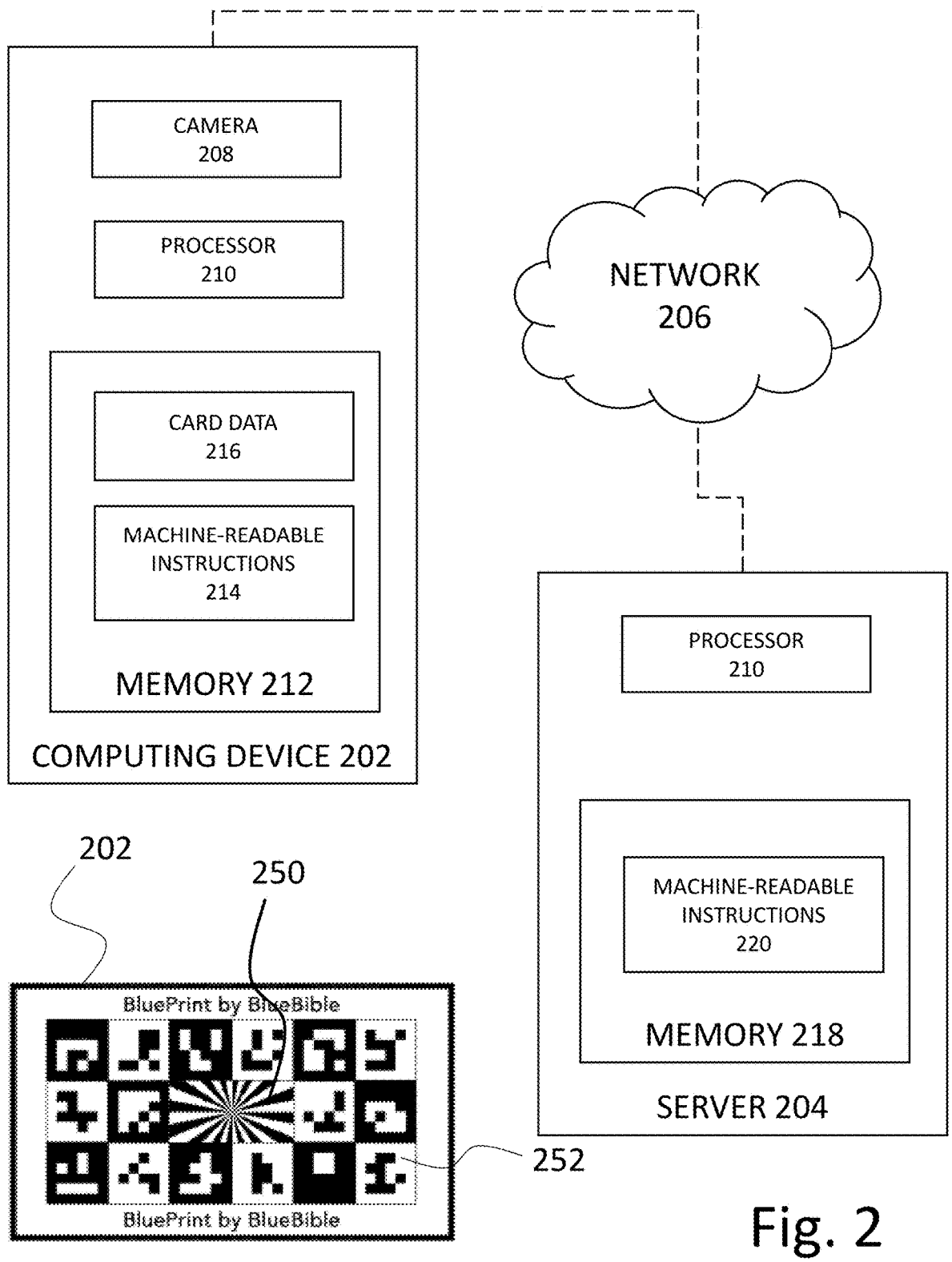
FIG. 2 is a block diagram illustrating a system for calculating the size of the object, according to some embodiments of the present invention.

Referring now to the drawings, FIG. 1 is a flowchart 100 illustrating a method for calculating a size of a photographed object, according to some embodiments of the present invention. FIG. 2 is a block diagram illustrating a system 200 for calculating the size of the object.

The system 200 of FIG. 2 includes a calibration card 202, a computing device 202. The computing device 202 may be connected to a remote server 204 via a network 206. In some embodiments of the present invention, the remote server 204 is also part of the system 200 of the present invention.

The computing device 202 includes a camera 208, a first processor 210, and a first memory 212. The first memory 212 stores machine-readable instructions 214 and optionally card data 216. The computing device 202 may be any computing device, such as a desktop computer, a laptop computer, a smart phone, a tablet, for example.

The remote server 204 includes a second processor 218 and a second memory 220. The second memory stores second machine-readable instructions 220, and optionally the card data 214.

At 102, the calibration card 202 is provided, having a predetermined picture 250 printed thereon. The picture includes a focusing artefact 250 configured to be seen clearly on a display of the computing device 202 only when the card is in focus. For example, the focusing artefact 250 comprises at least one of a Siemens star, a spoke target. In some embodiments of the present invention, the focusing artefact is surrounded squares 252 of a chess board or a charuco board. In some embodiments of the present invention, the height of the focusing artefact is the same as the height as a square 252 or has a height which is a multiple or the height of the square (such that the height of the square multiplied by an integer number yields the height of the focusing artefact 250). Similarly, in the same embodiment, the width of the focusing artefact is the same as the width as a square 252 or has a width which is a multiple or the width of the square (such that the width of the square multiplied by an integer number yields the width of the focusing artefact 250). In this manner, the focusing artefact 250 is a rectangle having corners aligned with corners of the adjacent squares 252.

At 104, a first real size of at least one dimension of the picture is provided to the computing device 202. The first real size may be provided by installing machine-readable instructions 214 with card data 216. The card data 216 is indicative of at least one dimension (e.g., width, height, diagonal) of the focusing artefact.

At 106, the camera 208 of the computing device 202 is set at a fixed focus. This may include setting the camera to the fixed focus selected from a plurality of predetermined fixed foci, according to a user input.

At 108, a first image of the calibration card is captured by using the camera. The first image is captured when the picture on the calibration card 202 is in focus (at the fixed focus set earlier). The camera may include a display configured for displaying the first image in real time. The first image may be captured by the user moving the camera and/or the calibration card with respect to each other, until an image of the picture is displayed (to the user) in focus on the display and by instructing (by the user) the computing device to capture the first image when the image of the picture on the display is in focus.

At 112, the computing device 202 measures a first virtual size of the at least one dimension in the first image in pixels. For example, if the first dimension of the picture is the length of the focusing artefact, the virtual size of the dimension in pixels is the length (from side to side) of the focusing artefact in the image. In the embodiment in which the focusing artefact 250 is aligned with the corners of surrounding squares 252, the computing device 202 can easily identify the location of the corners and accurately measure the first virtual size.

At 114, the computing device 202 calculates a pixel density of the first image, by dividing the first virtual size by the first real size.

At 116, a second image is captured via the camera. The second image is the image of an object, and is captured when the object is in focus (at the fixed focus set earlier). The user may see when the object is in focus via the display of the camera 204 (which may correspond to the display of the computing device 202).

At 120 the computing device 202 measures a second virtual size of at least one distance between two virtual points located on the second image. The distance of the object may be a length of the object, a width of the object, or any other dimension identified by the computing device 202. To this end, the first machine-readable instructions may include image processing software configured to identify an object in focus as the object of interest.

At 122, the computing device 202 calculates a second real size of at least one distance between two real points of the object corresponding to the two virtual points, The calculation is performed by dividing the second virtual size by the pixel density.

At 124, the second real size is stored in the memory of the computing device 202.

In some embodiments of the present invention, the object is a finger pad. At 126, the second image and the second real size are processed to generate a fingerprint impression of the finger pad. Once the fingerprint impression is generated, the fingerprint impression may be compared to a plurality of known fingerprints on a database accessible by the computing device. The database may be a free database available to anyone, or a database accessible to users having specific credentials.

In some embodiments of the present invention the processing of the second image to generate a fingerprint impression is performed by the computing device 202 via the first machine-readable instructions 214. The first machine-readable instructions 214 may include instructions for running a machine learning system pre-trained to generate the fingerprint impression of the finger form the second image and using the second real size.

In some embodiments of the present invention the processing of the second image to generate a fingerprint impression is performed by a machine learning system stored on the remote server 204. The machine learning system is configured to use the second machine-readable instructions 220 to generate the fingerprint impression of the finger form the second image and using the second real size.

Data indicative of the second image and the second real size is communicated from the computing device 202 to the remote server 204 via the network 206.

In some embodiments of the present invention, the machine-learning system (whether it is stored on the local computing device 202 or on the remote server 204) is pre-trained to generate fingerprint impressions from images of finger pads. For this, there exists the problem that datasets of optical finger pad images and accompanying black and white fingerprint images are not common. Generation of such a dataset using live subjects would be impractical, because effectively training a machine learning system to perform image transformation model requires thousands of images. Capturing both optical and images and scanned fingerprint impressions from thousands of subjects is impractical. Additionally, some machine-learning systems (such as generative adversarial networks, for example) may be highly sensitive to spatial translation, rotation, and distortion between the optical images and the scanned fingerprint images, and such differences between optical finger pad images and scanned fingerprint impressions are inevitable.

Therefore, in order to generate enough image pairs (of optical-like images of finger pads and their corresponding fingerprint impressions) to train a machine-learning system, a plurality of training fingerprint impressions is provided in black and white—from a database, for example.

The server generates a plurality of training images of finger pads, each training image being generated by a respective training fingerprint impression. The training images synthetically reproduce important features found in grayscale photographs of finger pad. These features may include, for example, the appearance of three dimensionality, lighting variations, etc. In this manner, the machine-learning system is able to make appropriate inferences about features present in photographs of finger pads based on the synthetic features of the training features.

Once the image pairs are generated, the image pairs are used to train the machine learning system to generate a fingerprint impression from a photographed finger pad image.

In some embodiments of the present invention, a method is provided for generating a training image of a finger pad based on an impression of a fingerprint. In the method, the training fingerprint impression is inverted, such that black regions are converted to white while white regions are converted to back, so that ridges of each fingerprint impression are shown in white while a background of each impression is shown in black.

Black color is removed from each background, leaving only the white ridges.

The ridges are embossed and beveled, thereby creating a three-dimensional appearance in which the ridges have a simulated shadow. The angle of embossment and beveling may differ for each fingerprint impression, in order to simulate natural variations in lighting in a real-life environment Each background is filled with a gray layer.

Noise is applied. The noise may be random noise.

So far, a partial image was created, without lighting effects.

Lighting effects are applied to the partial image to make certain regions of the final training image appear darker and other regions appear lighter. This is done by copying the original partial image layer into two new layers and applying brightness adjustments to make one layer lighter than the partial image, and the other layer darker than the partial image. A black layer mask is then applied to the two brightness-adjusted layers, thereby hiding them. White splotches of various sizes are randomly applied over the layer masks in order to reveal those regions. The composite result of all three layers is an image that simulates the natural lighting variations that would be present in a real photograph of a finger pad, thereby enhancing the three-dimensional effect.

Figure 8:
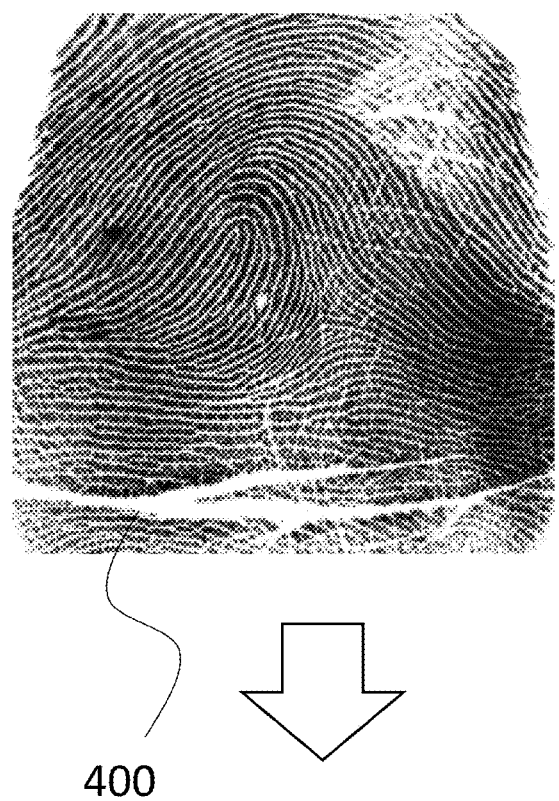
FIG. 8, shows an image of a fingerprint impression and a training image of a finger pad automatically reconstructed from the fingerprint impression, for training a machine learning system to generate a fingerprint impression from a photographed finger pad image, according to some embodiments of the present invention.
Figure 8:
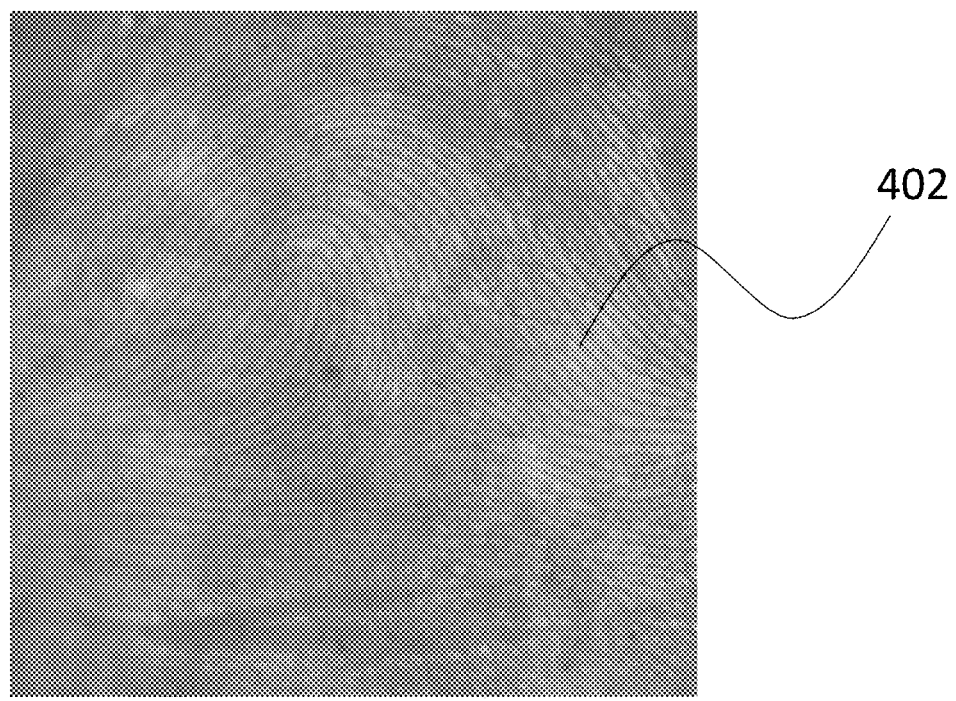

FIG. 8 shows an image of a fingerprint impression 400 and a training image 402 of a finger pad automatically reconstructed from the fingerprint impression. As mentioned above, the training image has some features that are found in photographs of finger pads, and this reconstruction may be performed for training a machine learning system to generate a fingerprint impression from a photographed finger pad image.

In some embodiments of the present invention, the object is a latent, patent, or plastic fingerprint impression. Once the impression is captured, the impression can be converted to a fingerprint template (e.g., black and white fingerprint impression, or any other format for fingerprints), by using calculating and using the size of the captured impression, as described above. The fingerprint template can then be compared to other fingerprint templates or impressions in a database.

FIGS. 3-7 illustrate some of the steps described above

Figure 3:
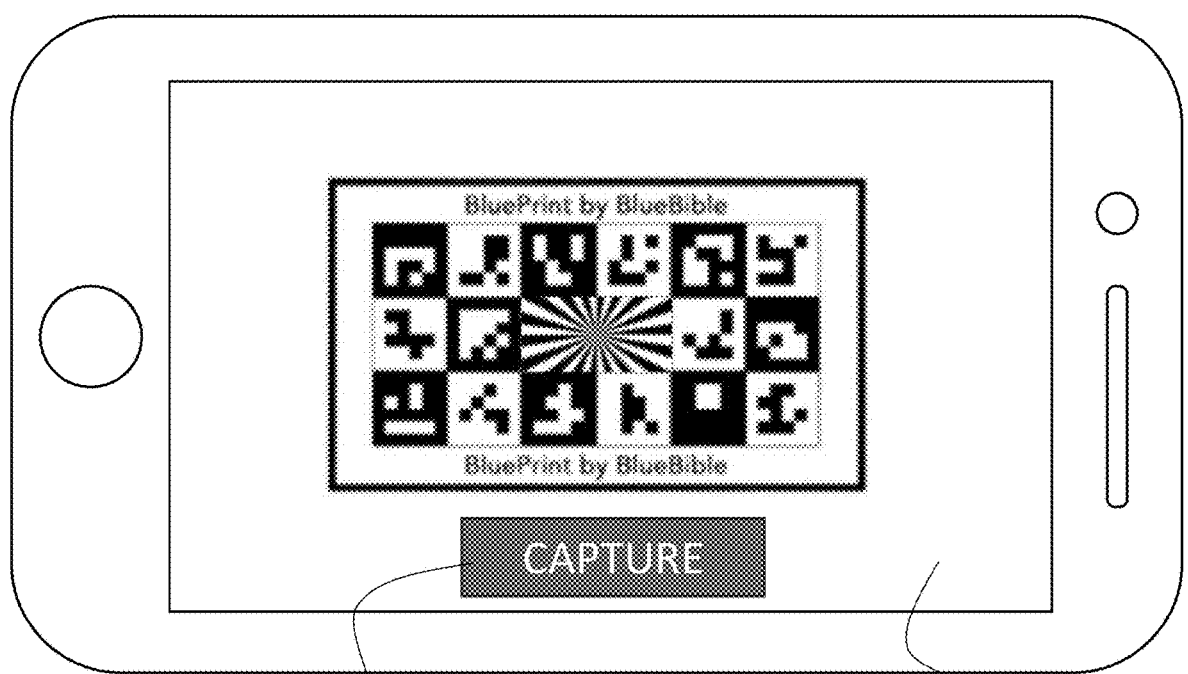
FIG. 3 illustrates an out-of-focus image of a calibration card on a display of a smart phone used for calculating the size of an object, according to some embodiment of the present invention.

FIG. 3 illustrates an out-of-focus image of the calibration card on the display 300 of the smart phone used as the computing device for calculating the size of an object, according to some embodiment of the present invention.

A capture button 302 is displayed on the display 300. However, at this point the image of the focusing artefact is out of focus and no image is captured.

Figure 4:
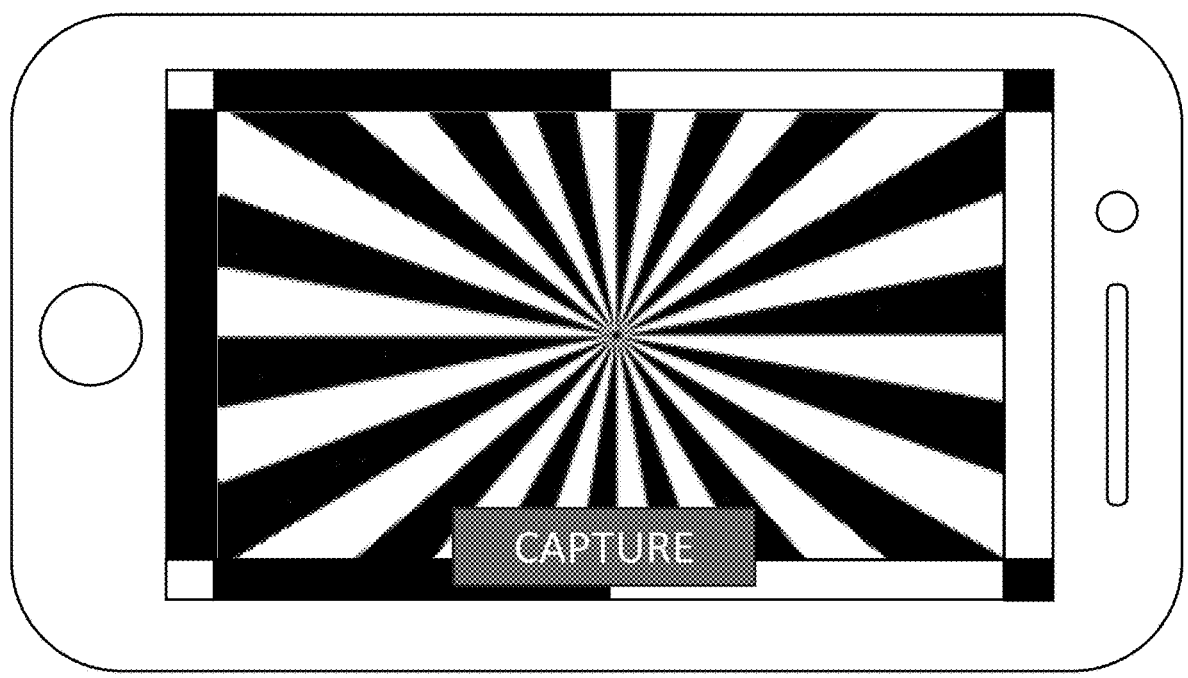
FIG. 4 illustrates an in-focus image of the calibration card on the screen of the smart phone used for calculating the size of an object, according to some embodiment of the present invention.

In FIG. 4, the calibration card and/or the smart phone are moved, so that the focusing artefact is in focus. At this point the user sees the focusing artefact in focus on the display and can capture the image.

Figure 5:
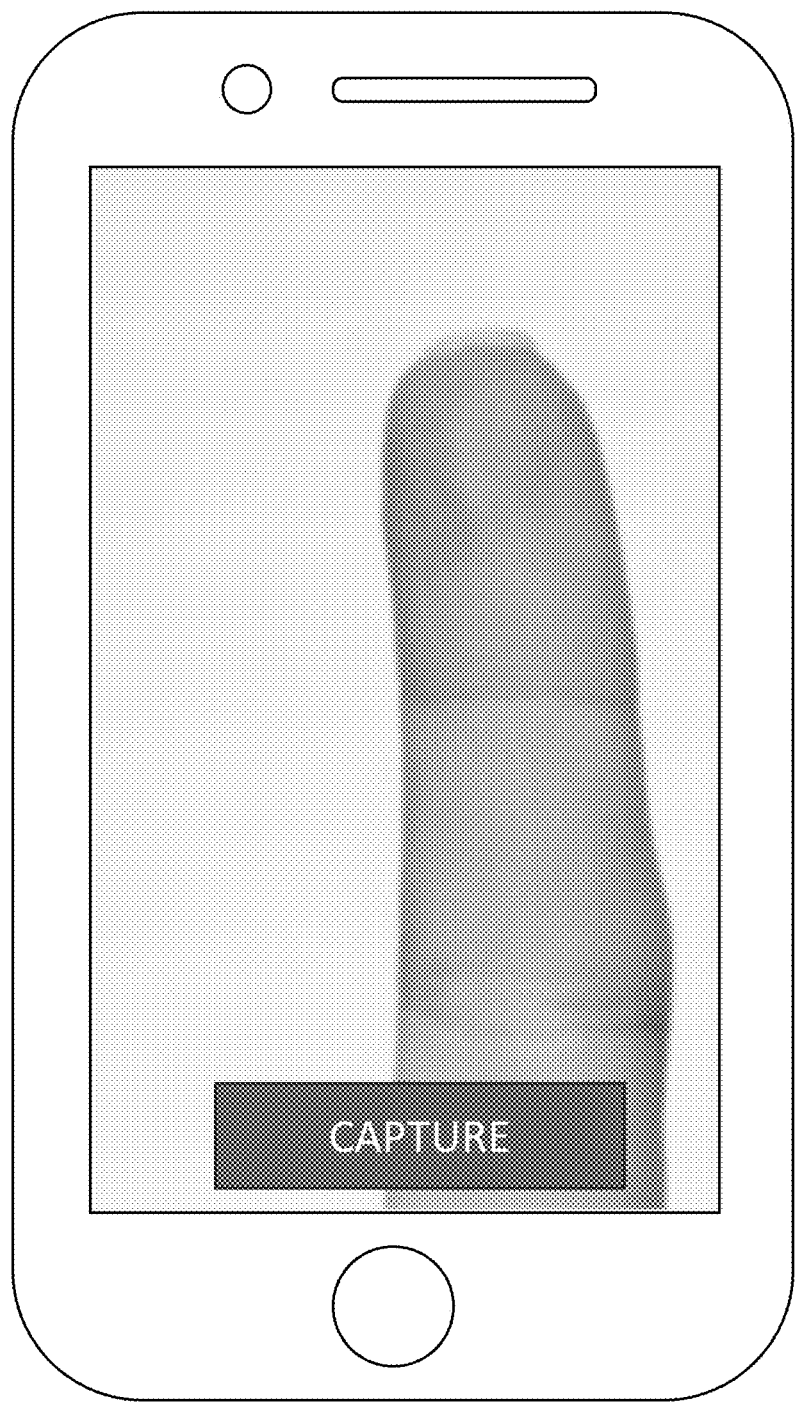
FIG. 5 illustrates an out-of-focus image of an object (e.g. finger) on the display of the smart phone used for calculating the size of the object, according to some embodiment of the present invention.
Figure 6:
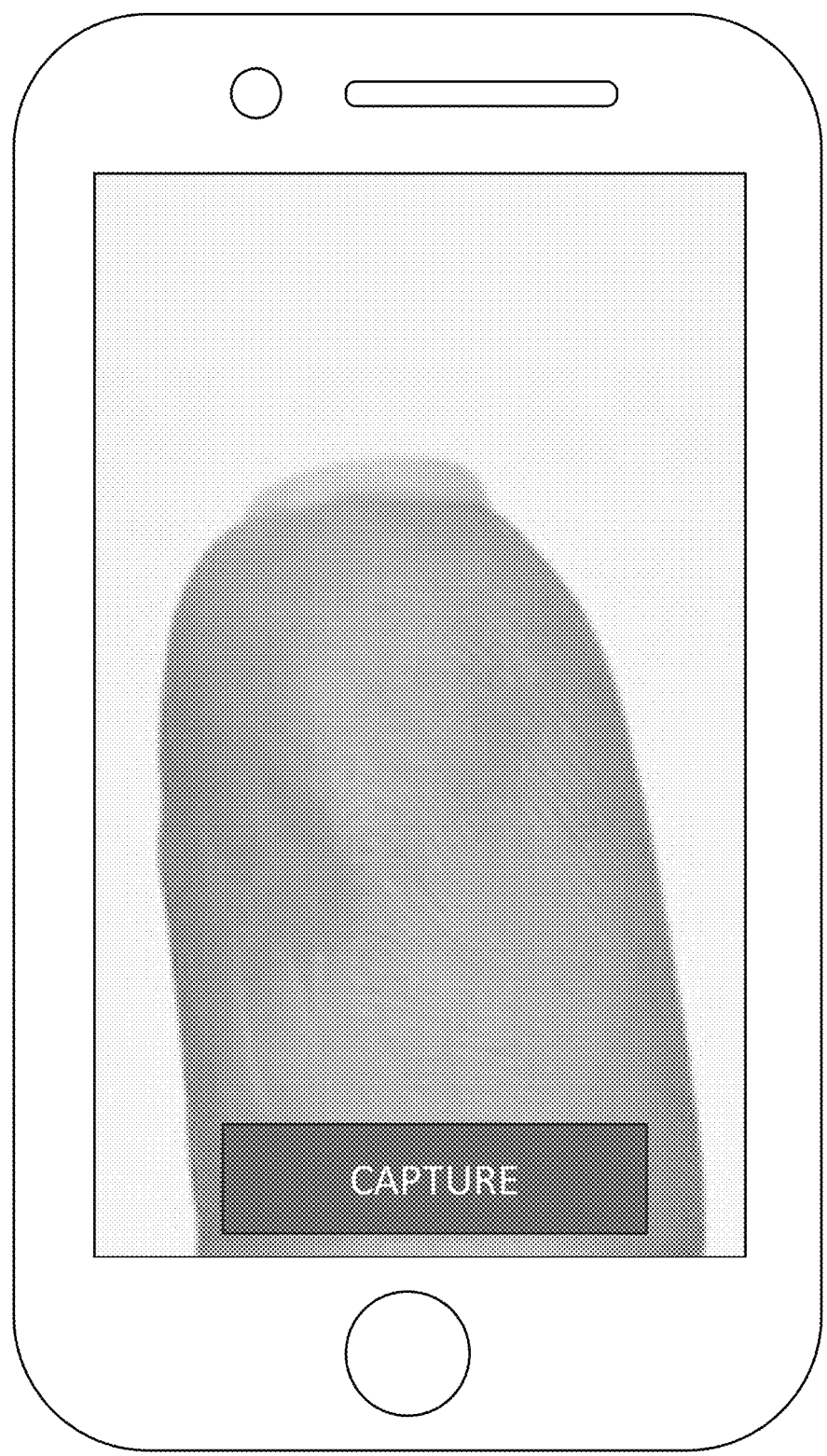
FIG. 6 illustrates an in-focus image of the object (e.g. finger) on the display of the smart phone used for calculating the size of the object, according to some embodiment of the present invention.

Following calibration, the computing device (e.g. smart phone) prepares for the capture the image of the object, which in this example is a finger pad. Initially, the finger pad may be out of focus, as seen in FIG. 5. The finger and/or the computing device (e.g., smart phone) are moved with respect to each other until the user sees that the finger pad's image is in focus on the display. At this point, the image is captured.

Figure 7:
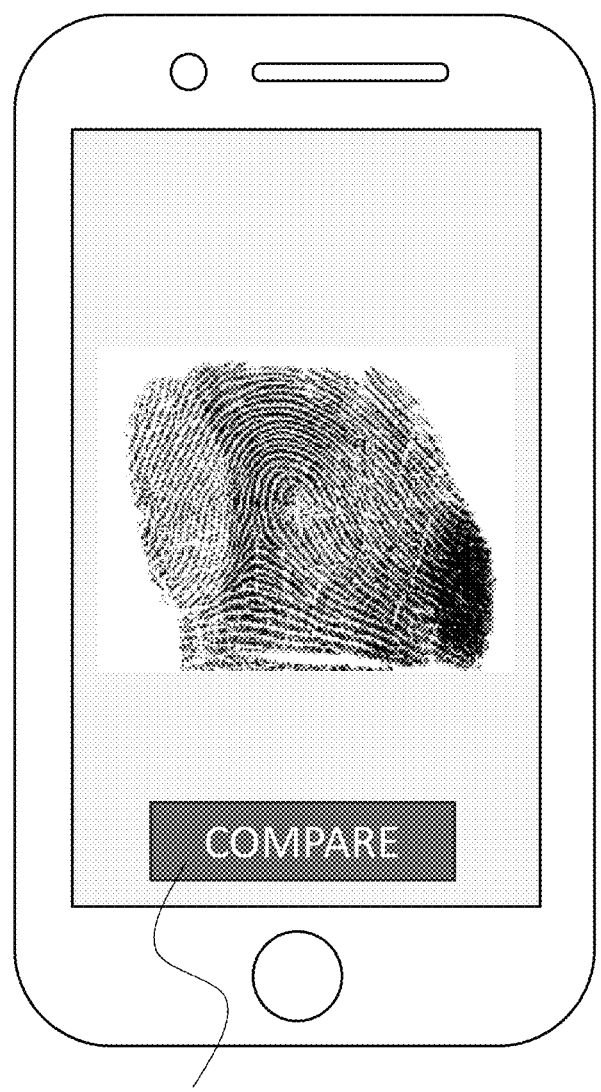
FIG. 7 illustrates an image of a fingerprint impression generated by a photograph of a finger pad, the image of the fingerprint impression being displayed on the display of the smart phone, according to some embodiment of the present invention.

In FIG. 7, an image of a fingerprint impression generated by a photograph of a finger pad is displayed on the display. As mentioned above, the image was generated by the remote server 204 of FIG. 2. In some embodiments of the present invention, the first machine-readable instruction on the computing device (e.g. smart phone) cause a "compare" button 304 to appear on the display. If the user pushed the compare button, the computing device (smart phone) accesses a database for comparing the fingerprint impression to known fingerprints. The database may be free or protected. If the database is protected, the user may be required to enter specific credentials to have access to the database.

What is claimed is:

1. A method for determining a size of an object, comprising:
   providing of a calibration card having a predetermined picture printed thereon;
   providing a first real size of at least one dimension of the picture to the computing device;
   setting a camera of a computing device to a fixed focus;
   capturing, with the camera, a first image of the calibration card, the first image being captured when the picture is in focus;
   measuring, via the computing device, a first virtual size of the at least one dimension in the first image in pixels;
   calculating via the computing device a pixel density of the first image, by dividing the first virtual size by the first real size
   capturing, with the camera, a second image of an object;
   measuring, via the computing device, a second virtual size;
   calculating, via the computing device, a second real size.

2. The method of claim 1, wherein the step of capturing, with the camera, a second image of an object, comprises capturing the second image of the object when the object is in focus;
   wherein the step of measuring, via the computing device, a second virtual size comprises measuring a second virtual size of at least one distance between two virtual points located on the second image;
   wherein the step of calculating, via the computing device, a second real size comprises calculating a second real size of at least one distance between two real points of the object corresponding to the two virtual points, by dividing the second virtual size by the pixel density.

3. The method of claim 1:
   wherein the computing device comprises a processor and memory; and
   providing the first real size to the computing device comprises installing machine-readable instructions in the memory, the machine-readable instruction comprising card data indicative of the first real size.

4. The method of claim 1, wherein the camera comprises a display configured for displaying the first image in real time; and
   wherein capturing the first image comprises:
      receiving, by computing device, a user instruction to capture the first image when an image of the picture on the display is in focus, after a user has moved the camera and/or the calibration card with respect to each other, until an image of the picture is displayed in focus on the display;
      activating the camera to capture the received image in response to the user instruction.

5. The method of claim 4, wherein providing the picture comprises providing a focusing artefact configured to be seen clearly on the display only when the card is in focus.

6. The method of claim 5, wherein the focusing artefact comprises at least one of a Siemens star, a spoke target.

7. The method of claim 1, wherein measuring the first virtual size comprises:
   locating, via the computing device, at least two corners on the picture; and
   measuring a distance between the two corners.

8. The method of claim 1, wherein setting the camera to the fixed focus comprises selecting the fixed focus from a plurality of fixed foci.

9. The method of claim 1, wherein the object is a finger pad and the second image is an image of a finger pad, the method further comprising:
   processing the second image and using the second real size to generate a fingerprint impression of the finger pad.

10. The method of claim 9, comprising comparing the fingerprint to a plurality of known fingerprints.

11. The method of claim 9, wherein processing the second image comprises:
    providing a machine learning system stored on the computing device or on a remote server and configured to generate the fingerprint impression of the finger form the second image and using the second real size; and
    processing, by the machine learning system, the second image and the second real size to generate the fingerprint impression.

12. The method of claim 11, wherein, providing the machine learning system comprises:
    providing a plurality of training fingerprint impressions in black and white;
    synthetically generating, by a second computing device, a plurality of training images of finger pads, each training image resembling a photographed image of a finger pad and being generated by a respective one of the training fingerprint impressions;
    using the plurality of fingerprint impressions and the plurality of corresponding training images to train the machine learning system to generate a fingerprint impression from a photographed finger pad image.

13. The method of claim 12, wherein synthetically generating the plurality of training images of finger pads comprises:
    inverting the training fingerprint impressions, such that black regions are converted to white while white regions are converted to black, so that ridges of each fingerprint impression are shown in white while a background of each impression is shown in black;
    removing black color from each background, leaving only the white ridges;
    embossing and beveling the ridges, thereby creating a three-dimensional appearance in which the ridges have a simulated shadow;
    filling each background with a gray layer;
    applying noise;
    applying lighting effects to make certain regions of each training image appear darker and other regions of each training image appear lighter.

14. The method of claim 11, wherein the machine learning system comprises a generative adversarial network.

15. A system for determining a size of an object, the system comprising:
a calibration card having a predetermined picture printed thereon;
a computing device having a camera, a processor, and a memory, and the memory storing at least one dimension of the picture and machine-readable instructions that, when executed by the processor, cause the processor to:
set a camera of a computing device to a fixed focus;
operate the camera to capture a first image of the calibration card according to a user instruction to the computing device, the first image being captured via the camera when the picture is in focus;
receive the first image from the camera;
measure a first virtual size in the first image in pixels, the first virtual size corresponding to the at least one dimension;
calculate a pixel density of the first image, by dividing the first virtual size by the first real size;
operate the camera to capture a second image of an object according to a user instruction to the computing device, the second image being captured via the camera when the object is in focus;
receive the second image from the camera;
measure a second virtual size of at least one distance between two virtual points located on the second image;
calculate a second real size of at least one distance between two real points of the object corresponding to the two virtual points, by dividing the second virtual size by the pixel density.

16. The system of claim 15, wherein:
the computing device comprises a display configured for displaying the first image in real time;
the picture comprises a focusing artefact configured to be seen clearly on the display only when the card in focus.

17. The system of claim 15, wherein the processor is configured to measuring the first virtual size by:
locating, via the computing device, at least two corners on the picture; and
measuring a distance between the two corners.

18. The system of claim 15, wherein the object is a finger pad and the second image is an image of a finger pad, the system comprising, in the machine-readable instructions, image processing instructions configured to cause the processor to process the second image and use the second real size to generate a fingerprint impression image of the finger pad.

19. The system of claim 15, further comprising a server configured to communicate with the computing device via a network, the server comprising a second processor and a second memory, the second memory storing second machine-readable instructions which, when executed, cause the processor to process the second image and use the second real size to generate a fingerprint impression image of the finger pad.

20. Machine-readable instructions, stored on a non-transitory computer readable medium, configured to be executed by a processor and cause the processor of a computing device to:
set a camera of a computing device to a fixed focus according to a first user instruction;
receive from the camera a first image of a calibration card having a predetermined picture printed thereon, the first image being photographed by a second user instruction to the computing device, the first image being captured via the camera when the picture is in focus;
measure a first virtual size in the first image in pixels, the first virtual size corresponding to the at least one dimension;
calculate a pixel density of the first image, by dividing the first virtual size by the first real size;
receive from the camera a second image of an object, the second image being photographed by a third user instruction to the computing device, when the object is in focus;
measure a second virtual size of at least one distance between two virtual points located on the second image;
calculate a second real size of at least one distance between two real points of the object corresponding to the two virtual points, by dividing the second virtual size by the pixel density.

* * * * *